United States Patent
Chen (10) Patent No.: US 8,866,609 B2
(45) Date of Patent: Oct. 21, 2014

(54) RFID-BASED ELECTRIC SEAL WITH TRACKING DEVICE

(71) Applicant: Chih Chuan Chen, Nantou (TW)

(72) Inventor: Chih Chuan Chen, Nantou (TW)

( * ) Notice: Subject to any disclaimer, the term of this patent is extended or adjusted under 35 U.S.C. 154(b) by 7 days.

(21) Appl. No.: 13/751,205

(22) Filed: Jan. 28, 2013

(65) Prior Publication Data

US 2014/0210615 A1  Jul. 31, 2014

(51) Int. Cl.
*G08B 1/08* (2006.01)
*G08B 13/08* (2006.01)
*G06K 19/077* (2006.01)
*G08B 13/24* (2006.01)

(52) U.S. Cl.
CPC ............ *G08B 13/08* (2013.01); *G08B 13/2434* (2013.01); *G06K 19/0775* (2013.01)
USPC ................. 340/539.13; 340/572.8; 340/572.9

(58) Field of Classification Search
CPC .................... G08B 13/2434; G06K 19/07749; G06K 19/07758; G06K 19/0775
USPC .................. 340/539.13, 572.8, 572.9; 29/282
See application file for complete search history.

(56) References Cited

U.S. PATENT DOCUMENTS

| 7,215,250 | B2 * | 5/2007 | Hansen et al. .............. 340/572.9 |
| 7,298,274 | B2 | 11/2007 | Chen et al. |
| 8,319,647 | B2 * | 11/2012 | Chen ........................... 340/572.8 |
| 8,487,768 | B2 * | 7/2013 | Lee et al. .................... 340/572.8 |
| 8,558,700 | B2 * | 10/2013 | Chen ........................... 340/572.8 |

* cited by examiner

*Primary Examiner* — John A Tweel, Jr.
(74) *Attorney, Agent, or Firm* — Charles E. Baxley (57) ABSTRACT

An electric seal includes a wireless tracking facility having a wireless telecommunicating device disposed in a container and having two contacts, a housing engaged in the receptacle, and a lock shaft engageable into the receptacle and lockable to the housing for retaining the receptacle and the housing together, and the lock shaft includes a portion electrically connected to one of the contacts of the wireless telecommunicating device and another portion connected to the other contact of the wireless telecommunicating device for electrically coupling to the contacts of the wireless telecommunicating device together, and the wireless telecommunicating device emits a signal out when the lock shaft is cut or damaged.

12 Claims, 6 Drawing Sheets

RFID-BASED ELECTRIC SEAL WITH TRACKING DEVICE

BACKGROUND OF THE INVENTION

1. Field of the Invention

The present invention relates to an electric lock or seal, and more particularly to a radio frequency identification (RFID)-based electric lock or seal using RFID technology to secure and to identify containers or other objects, and including a wireless tracking facility or system for searching or tracking the containers or other objects and for securing or rescuing the containers or other objects when stolen or when required.

2. Description of the Prior Art

Various kinds of typical RFID-based electric locks or seals have been developed and provided for locking or sealing or identifying containers or other objects, and comprise a complicated structure including a number of parts or elements that are required to be manufactured separated and are then required to be assembled together.

For example, U.S. Pat. No. 7,298,274 to Chen et al. discloses one of the typical passive RFID-based electric locks or seals also developed and provided for locking or sealing or identifying containers or other objects, and comprising a complicated structure including a lower body and an upper body, an upper sleeve, a central sleeve, and a lower sleeve, two antennas, an RFID chip, and two sockets that are required to be made or manufactured separated and then required to be assembled together by specialized persons.

However, the great number of parts or elements may not be easily manufactured and assembled, and a large man-power or specialized persons will be required to assemble the parts or elements together, such that the manufacturing cost for the electric locks or seals will be greatly increased.

In addition, when the electric locks or seals have been cut or unlocked or stolen by unauthorized persons, the users or owners of the containers or other objects may not know or realize the situation and may not ask for help at the very first moment, and thus may not suitably secure or rescue the containers or other objects right away when stolen or required.

The present invention has arisen to mitigate and/or obviate the afore-described disadvantages of the conventional RFID-based electric locks or seals.

SUMMARY OF THE INVENTION

The primary objective of the present invention is to provide an RFID-based electric seal using RFID technology to secure and to identify containers or other objects and including a wireless tracking facility or system for searching or tracking the containers or other objects and for securing or rescuing the containers or other objects when stolen or when required.

In accordance with one aspect of the invention, there is provided an electric seal comprising a wireless tracking facility including a receptacle, and a wireless telecommunicating device disposed in the container and having a first contact and a second contact, a housing engaged in the receptacle and including an opening formed in the housing, and a lock shaft engageable into the receptacle and lockable to the housing for retaining the receptacle and the housing together, and including a first portion electrically connecting to the first contact of the wireless telecommunicating device and a second portion electrically connecting to the second contact of the wireless telecommunicating device for electrically coupling to the first contact and second contact of the wireless telecommunicating device together, and the wireless telecommunicating device emitting a signal out when the lock shaft is damaged.

The lock shaft includes an insulated covering disposed and located between the first portion and the second portion of the lock shaft. The lock shaft includes an electrical conductive member mounted onto the lock shaft and contacted with the insulated covering, and the electrical conductive member includes an upper portion extended out of the insulated covering and electrically connected to the second portion of the lock shaft and includes a lower portion.

A first electrode may further be provided and electrically connected to the first portion of the lock shaft and electrically connected to the first contact of the wireless telecommunicating device, and a second electrode electrically connected to the second portion of the lock shaft and electrically connected to the second contact of the wireless telecommunicating device.

A seat may further be provided and disposed on the receptacle and including a hole formed in the seat for engaging with the lock shaft, and including a peripheral flange located around the hole of the seat, and the first electrode being attached to the peripheral flange of the seat and extended downwardly beyond the seat for electrically connecting and engaging with the first contact of the wireless telecommunicating device, and the second electrode being attached to the peripheral flange of the seat and extended downwardly beyond the seat for electrically connecting and engaging with the second contact of the wireless telecommunicating device.

The receptacle includes an aperture formed therein and aligned with the opening of the housing and the hole of the seat for engaging with the lock shaft. The receptacle includes a cavity formed therein and communicating with the cavity of the receptacle for receiving and engaging with the housing.

The electrical conductive member includes an outwardly inclined skirt formed in the lower portion of the electrical conductive member for engaging with the peripheral flange of the seat.

The lock shaft includes a sheath attached onto the lock shaft and engaged with the electrical conductive member for covering and shielding the lock shaft and the conductive member, and the sheath includes an outwardly inclined peripheral member for engaging with the peripheral flange of the seat.

The lock shaft includes a groove formed in the first portion of the lock shaft, and the housing includes a latch member for selectively engaging with the groove of the lock shaft and for locking the lock shaft to the housing.

The housing includes a chamber formed therein for receiving and engaging with an antenna member, and the lock shaft includes a bore formed therein for receiving and engaging with a circuit board, and the circuit board includes a lower end portion for engaging with the antenna member and includes an RFID chip coupled to the circuit board.

The housing includes a lock member engaged in the chamber of the housing, the antenna member is engaged in the lock member and includes an upper segment, the lock shaft includes a shank received and engaged in the bore of the lock shaft and extended out of the lock shaft and selectively contacted with the upper segment of the antenna member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Referring to the drawings, and initially to FIGS. 1-5, an RFID-based electric seal in accordance with the present invention comprises a wireless tracking system or facility 1 normally provided for tracking containers or other objects and including a wireless telecommunicating device 11 and/or a wireless or remote or satellite tracking device 12 disposed in an outer container or receptacle 10, in which the wireless telecommunicating device 11 is electrically connected or coupled to the wireless or remote or satellite tracking device 12, and the wireless tracking facility 1 further includes a chamber or compartment or cavity 13 formed in the receptacle 10 and opened outwardly or forwardly, and includes an opening or orifice or aperture 14 formed in the receptacle 10, such as formed in the upper portion of the receptacle 10 and communicating with the cavity 13 of the receptacle 10, and includes one or more batteries 80 electrically connected or coupled to the wireless telecommunicating device 11 and/or the wireless or remote or satellite tracking device 12 for energizing the same.

Figure 1:
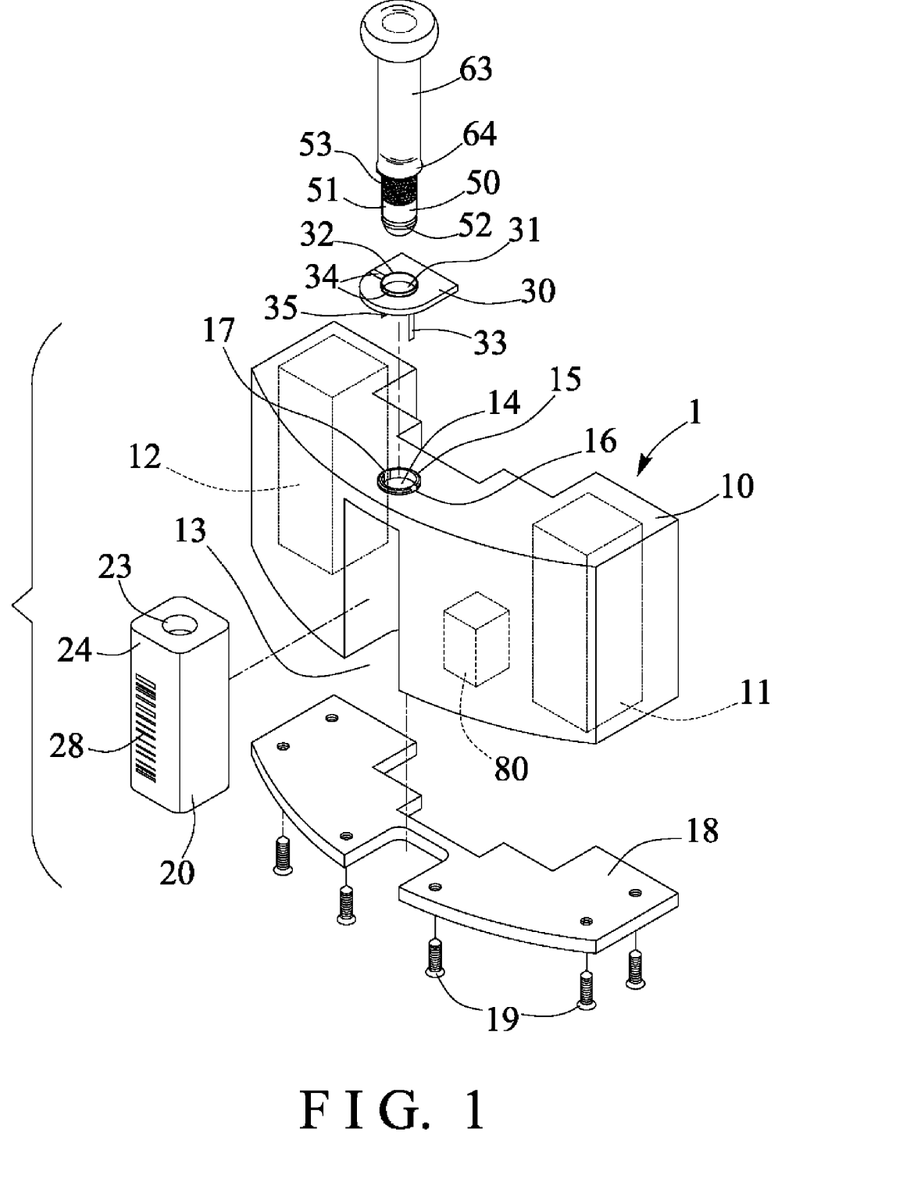
FIG. 1 is a partial exploded view of an RFID-based electric lock or seal in accordance with the present invention.
Figure 2:
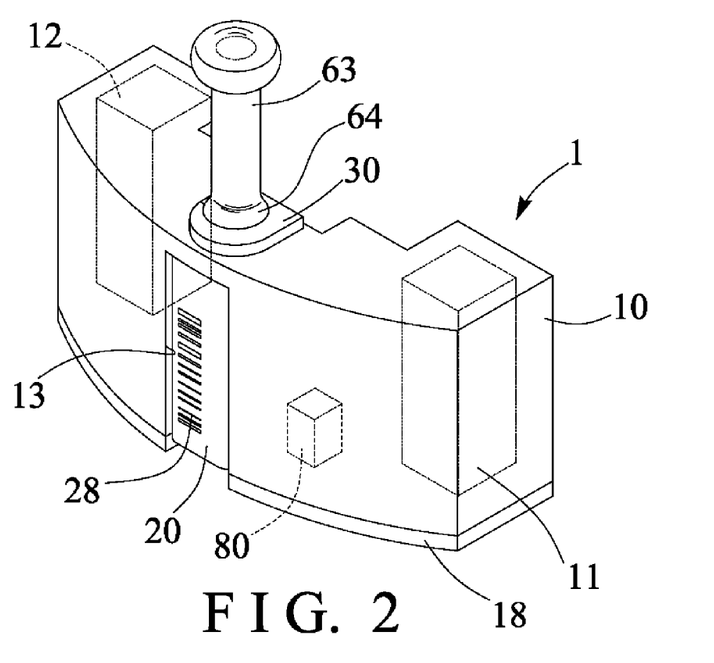
FIG. 2 is a perspective view of the RFID-based electric lock or seal.
Figure 7:
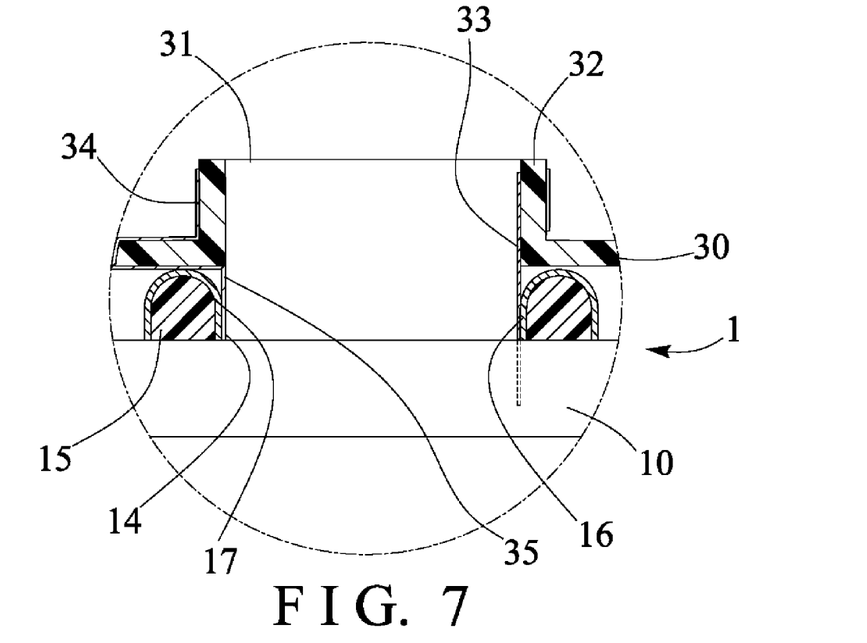
FIG. 7 is an enlarged partial cross sectional view of the RFID-based electric lock or seal as seen in FIG. 5.
Figure 8:
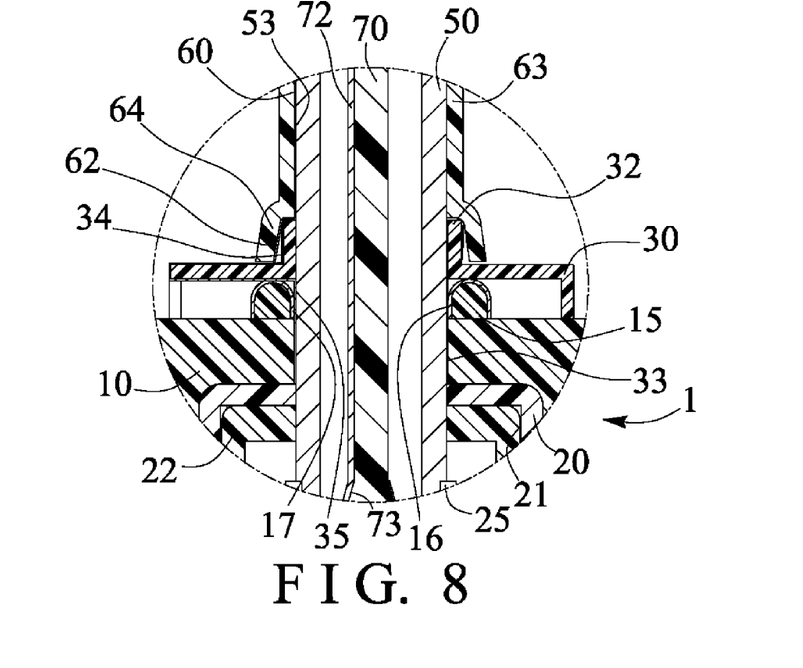
FIG. 8 is a further enlarged partial cross sectional view of the RFID-based electric lock or seal as seen in FIG. 3.

As best shown in FIGS. 1 and 7-8, the wireless tracking facility 1 further includes a peripheral rib 15 extended or protruded upwardly from the receptacle 10 and located and arranged out of or around the aperture 14 of the receptacle 10 for forming or defining the aperture 14 of the receptacle 10, and includes two terminals or electrodes or contacts 16, 17 disposed or attached or mounted or secured on the peripheral rib 15 and located and arranged opposite to each other and faced toward each other and electrically connected or coupled to the wireless telecommunicating device 11 and/or the wireless or remote or satellite tracking device 12, and includes a cap or cover 18 attached or mounted or secured to the bottom portion 19 thereof for solidly and stably anchoring or positioning or securing or retaining or confining the wireless telecommunicating device 11 and/or the wireless or remote or satellite tracking device 12 within the receptacle 10.

A lock body or outer housing 20 is received or engaged in the cavity 13 of the receptacle 10 and includes a chamber 21 formed therein for receiving or engaging with a core or insert or lock member 22 therein (FIGS. 3, 8), and includes an opening 23 formed in the upper portion 24 of the housing 20 (FIG. 1) and communicating with the chamber 21 of the housing 20, in which the opening 23 of the housing 20 is aligned with the aperture 14 of the receptacle 10, and the housing 20 further includes a clamping or retaining ring or latch or catch device or latch member 25 disposed or attached or mounted or secured or anchored or retained in the housing 20 and located and arranged above the lock member 22, and the housing 20 further includes an antenna member 26 disposed or engaged in the lock member 22 for signal receiving and transmitting purposes.

Figure 3:
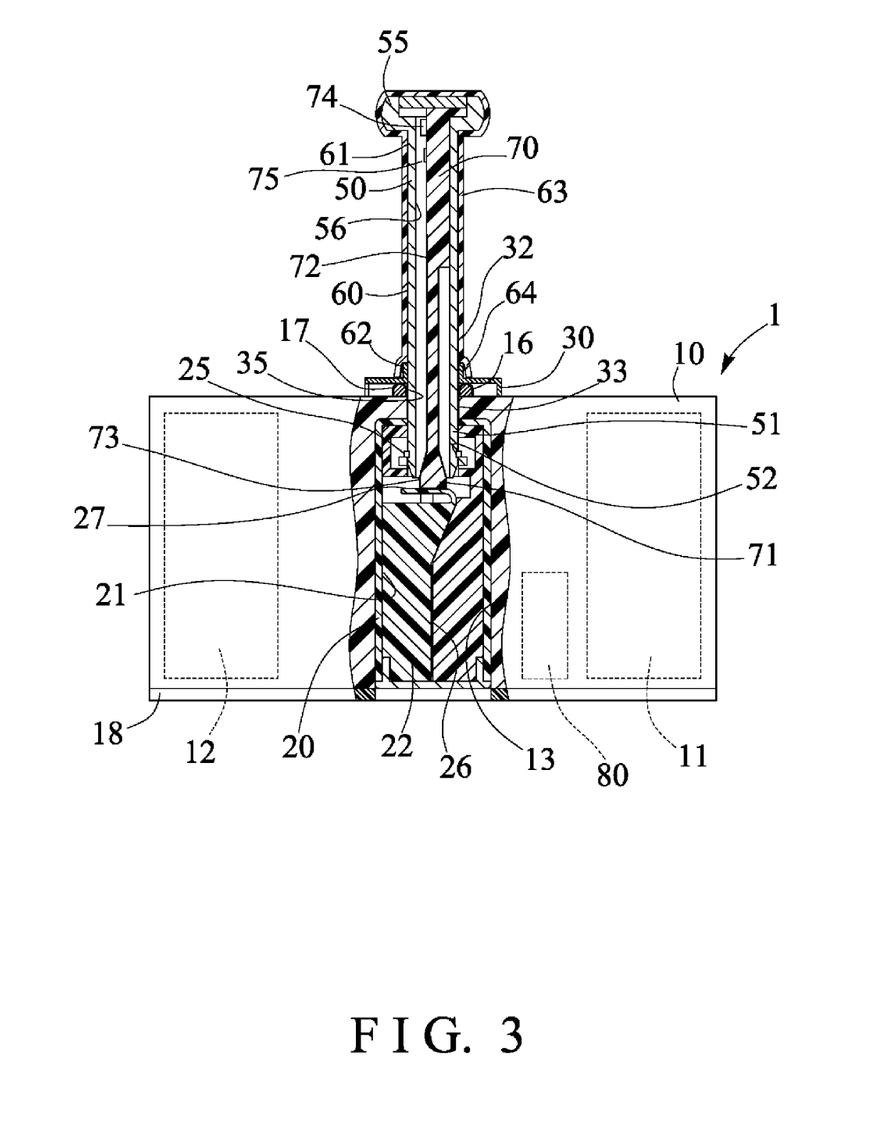
FIG. 3 is a front plan schematic view of the RFID-based electric lock or seal, in which a portion of the RFID-based electric lock or seal has been cut off for showing the inner structure of the RFID-based electric lock or seal.
Figure 4:
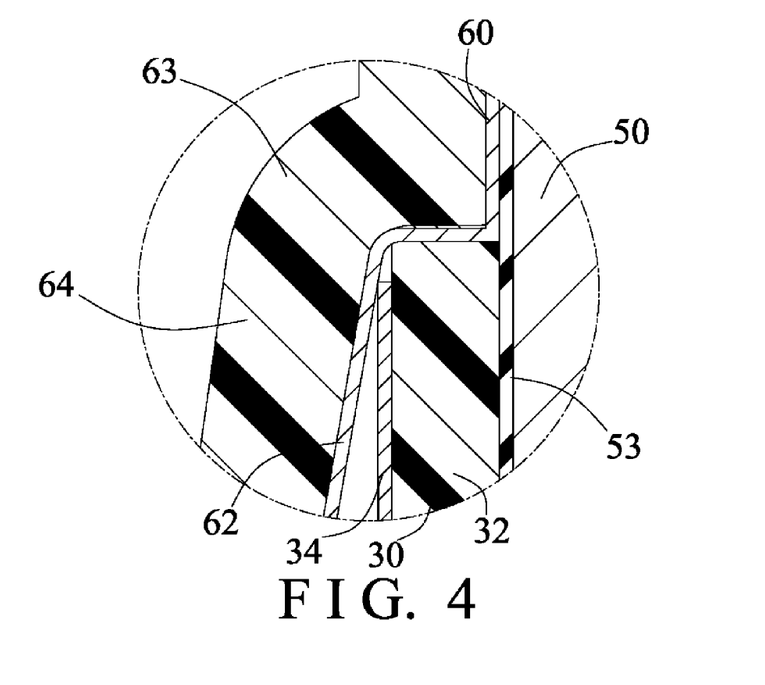
FIG. 4 is an enlarged partial cross sectional view of the RFID-based electric lock or seal.

As also shown in FIG. 3, the antenna member 26 includes an upper segment 27 arranged and located below the opening 23 of the housing 20 and also located below the latch member 25, and preferably arranged or positioned horizontally relative to the housing 20 and the antenna member 26, in which the antenna member 26 may include or may be formed with or by two or more portions or blocks or segments, for example, and the antenna member 26 may be disposed or attached or mounted or secured or engaged in or between the segments of the antenna member 26. The housing 20 includes a barcode 28 or the like attached or mounted or applied on the outer peripheral portion thereof and directed or faced outwardly of the housing 20 (FIGS. 2, 5) for being seen and read by the users or the like.

Figure 6:
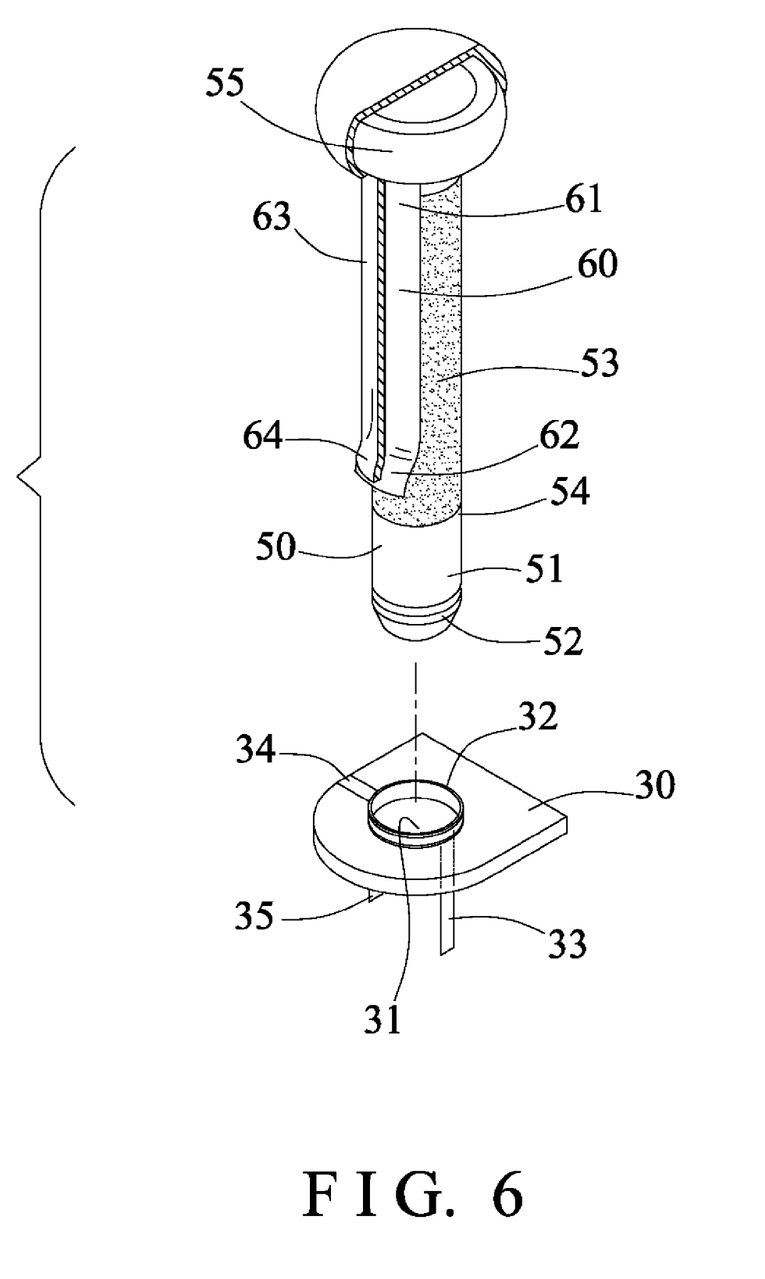
FIG. 6 is another partial exploded view of the RFID-based electric lock or seal.

A platform or base or bracket or seat 30 may further be provided and disposed or arranged or located above the receptacle 10 and the housing 20 and includes an opening or aperture or orifice or hole 31 formed therein and aligned with the aperture 14 of the receptacle 10 (FIGS. 1, 7-8), and further includes a peripheral flange 32 extended or protruded upwardly therefrom and located and arranged out of or around the hole 31 thereof for forming or defining the hole 31 thereof, and the seat 30 may further include a first terminal or electrode 33 attached or mounted or secured to the inner portion of the hole 31 and/or the peripheral flange 32 of the seat 30 and extended downwardly beyond the seat 30 (FIGS. 6-8) for selectively and electrically connecting or coupling or engaging with one of the contacts 16 of the receptacle 10, also shown in FIGS. 7 and 8.

Another or a second terminal or electrode 34 is attached or mounted or secured or engaged or disposed around the peripheral flange 32 of the seat 30 and includes a lower portion or segment 35 extended downwardly beyond the seat 30 for selectively and electrically connecting or coupling or engaging with the other contact 17 of the receptacle 10, it is to be noted that the electrodes 33, 34 are offset or disengaged or separated or spaced from each other and will not be electrically connected or coupled together and are electrically connected or coupled or engaged with the contacts 16, 17 of the receptacle 10 or of the wireless telecommunicating device 11 respectively for selectively and electrically connecting or coupling to the wireless telecommunicating device 11 and/or the wireless or remote or satellite tracking device 12 of the wireless tracking facility 1.

A lock shaft 50 includes a lower or first portion 51 for selectively engaging into the hole 31 of the seat 30 and then into the aperture 14 of the receptacle 10 and then into the opening 23 of the housing 20, and includes an outer peripheral slot or groove 52 formed in the lower or first portion 51 of the lock shaft 50 (FIGS. 1, 5, 6) for selectively engaging with the latch member 25 (FIG. 3) and for locking or securing the lock shaft 50 to the lock member 22 and/or the housing 20 and/or for solidly or stably locking or retaining the housing 20 and the receptacle 10 together. The lock shaft 50 is manufactured or made of metal or electrically conductive materials and includes the lower or first portion 51 directly and electrically connected or coupled to the first contact 16 of the receptacle 10 or indirectly with the first electrode 33, and includes an insulated or non-conductive covering 53 attached or mounted or secured or applied to the outer peripheral portion at the middle or intermediate portion 54 of the lock shaft 50, but not attached or engaged or applied to the lower or first portion 51 and an upper or second portion 55 of the lock shaft 50; i.e., the insulated or non-conductive covering 53 is disposed and located between the lower or first portion 51 and the upper or second portion 55 of the lock shaft 50.

It is to be noted that the electrode 33 is longer than the lower portion or segment 35 of the second electrode 34 (FIGS. 6-8) and is long enough to electrically connect or couple to the lower portion 51 of the lock shaft 50, and relatively, the lower segment 35 of the second electrode 34 is shorter than the other electrode 33 and is contacted or engaged with the insulated or non-conductive covering 53 only, but not contacted or engaged with the lower portion 51 of the lock shaft 50 such that the lower portion 51 of the lock shaft 50 will not electrically connect or couple to both the electrodes 33, 34, and will be electrically connected or coupled to only the longer electrode 33, and such that the electrodes 33, 34 and the contacts 16, 17 of the receptacle 10 will not be electrically connected or coupled together and will not be short-circuited.

Another electrode or electrical conductive member 60 is attached or mounted or secured onto the lock shaft 50, and includes an upper segment or portion 61 extended outwardly beyond the insulated or non-conductive covering 53 and electrically connected or coupled to the conductive upper or second portion 55 of the lock shaft 50, and includes an outwardly enlarged or inclined lower portion or skirt 62 that is located in the range of the insulated or non-conductive covering 53 for selectively contacting or engaging with and for electrically connecting or coupling to the second electrode 34 (FIGS. 3, 4, 8) when the conductive lower portion 51 of the lock shaft 50 is solidly or stably locked or retained to the housing 20 and the receptacle 10 and when the skirt 62 of the electrical conductive member 60 is engaged onto the peripheral flange 32 of the seat 30 and engaged with the conductive second electrode 34.

An outer protective or water-resistive covering or sheath 63 is attached or mounted or secured or applied onto the lock shaft 50 for covering or shielding the upper portion 55 and the middle or intermediate portion 54 of the lock shaft 50 and the conductive member 60, and also includes an outwardly enlarged or inclined or peripheral portion or member 64 for selectively shielding and engaging with the peripheral flange 32 of the seat 30 (FIGS. 3, 4, 8) and for solidly or stably anchoring and retaining the lower portion or skirt 62 of the electrical conductive member 60 in contact or engagement with the second electrode 34 (FIGS. 3-4, 8), and also for preventing the humidity or liquid or water from entering and contacting with the conductive upper portion 55 of the lock shaft 50 and the second electrode 34 and for suitably sealing and protecting the second electrode 34 from being damaged by the humidity or liquid or water.

Figure 5:
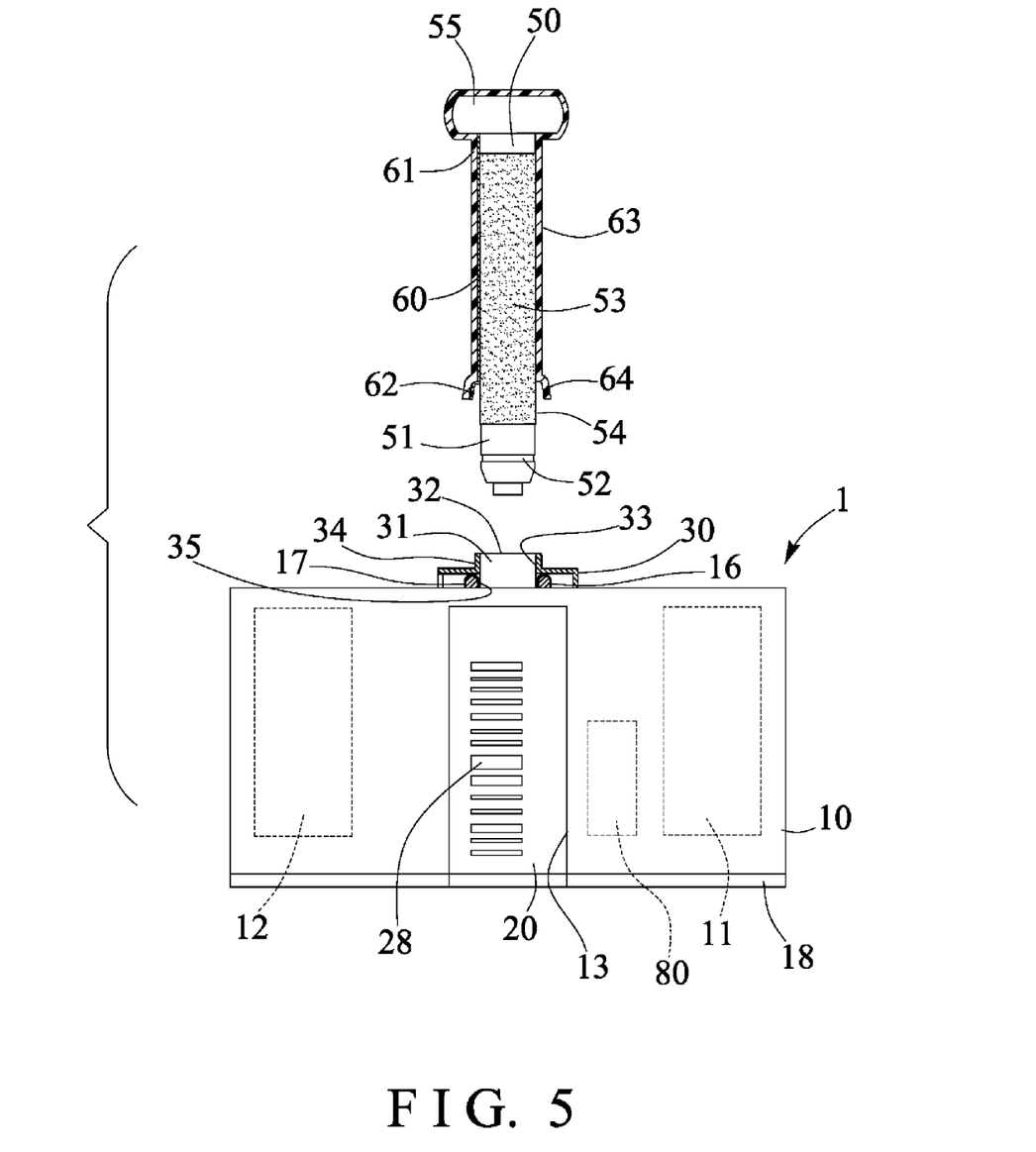
FIG. 5 is a front plan and partial exploded and partial cross sectional view of the RFID-based electric lock or seal.

In operation, as shown in FIGS. 1 and 5, the lock shaft 50 is originally separated from the housing 20 and the wireless tracking facility 1 and may be selectively engaged into the hole 31 of the seat 30 and then into the aperture 14 of the receptacle 10 and then into the opening 23 of the housing 20, and the latch member 25 (FIG. 3) may then be engaged with the outer peripheral groove 52 of the lock shaft 50 for locking or securing the lock shaft 50 to the lock member 22 and/or the housing 20 and/or for solidly or stably locking or retaining the housing 20 and the receptacle 10 together. The conductive lower portion 51 of the lock shaft 50 is electrically connected or coupled to the first electrode 33 and the first contact 16 of the receptacle 10 (FIGS. 3, 8), and the conductive upper portion 55 of the lock shaft 50 may be directly and electrically connected or coupled to the other or second contact 17 of the receptacle 10 or indirectly with the second electrode 34 for electrically connecting or coupling to the contacts 16, 17 of the receptacle 10 and of the wireless telecommunicating device 11 and/or the wireless or remote or satellite tracking device 12 of the wireless tracking facility 1 together.

When the contacts 16, 17 of the receptacle 10 and of the wireless telecommunicating device 11 and/or the wireless or remote or satellite tracking device 12 of the wireless tracking facility 1 are electrically connected or coupled together, the wireless telecommunicating device 11 may continuously emit or send or transmit signals to a remote control center (not shown) who may track the position and location or movement of the wireless tracking facility 1. When the lock shaft 50 is cut or unlocked or stolen by unauthorized persons or the like, the users or owners of the containers or other objects or the workers in the remote control center may know or realize the situation and the position and the location or the movement of the wireless tracking facility 1 and may ask for help at the very first moment when the lock shaft 50 is cut or broken or damaged, and thus may suitably secure or rescue the containers or other objects right away when the containers are stolen or when required.

As shown in FIGS. 3 and 8, the lock shaft 50 further includes a slit or bore 56 formed therein for receiving or engaging with a shank 70 and a circuit board 72 therein, the shank 70 is secured and retained in the bore 51 of the lock shaft 50 and includes a lower portion 71 extended out of the lock shaft 50 (FIG. 3) for selectively contacting or engaging with the upper segment 27 of the antenna member 26, and the circuit board 72 is attached or mounted or secured to the shank 70 and includes a lower end portion 73 also extended out of the lock shaft 50 and selectively contacted or engaged with the upper segment 27 of the antenna member 26, and includes an RFID chip 74 and one or more batteries 75 attached or mounted or coupled or connected to the circuit board 72 for identifying the identity of the RFID-based electric seal when the RFID chip 74 is electrically coupled or connected to the antenna device 26 and may be used to generate or emit a signal to identify the identity of the RFID-based electric seal.

In operation, when the lock shaft 50 is disengaged from the lock member 22 or the housing 20, or when the circuit board 72 is disengaged from the upper segment 27 of the antenna member 26, the circuit board 72 and/or the RFID chip 74 will be switched off and the RFID chip 74 may no longer be used to generate or emit the signal to identify the identity of the RFID-based electric seal, such that the remote control center (not shown) may realize or know that the lock shaft 50 has been disengaged from the lock member 22 or the housing 20, or that the RFID-based electric seal has been damaged by unauthorized persons or the like. The circuit board 72 and/or the RFID chip 74 may also be directly attached to the lower portion 51 of the lock shaft 50 for engaging with the upper segment 27 of the antenna member 26.

Accordingly, the RFID-based electric seal in accordance with the present invention includes a wireless tracking facility or system for searching or tracking the containers or other objects and for securing or rescuing the containers or other objects when stolen or when required.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An electric seal comprising:
   a wireless tracking facility including a receptacle, and a wireless telecommunicating device disposed in said receptacle and having a first contact and a second contact, a housing engaged in said receptacle and including an opening formed in said housing, and a lock shaft engageable into said receptacle and lockable to said housing for retaining said receptacle and said housing together, and including a first portion electrically connecting to said first contact of said wireless telecommunicating device and a second portion electrically connecting to said second contact of said wireless telecommunicating device for electrically coupling to said first contact and second contact of said wireless telecommunicating device together, and said wireless telecommunicating device emitting a signal out when said lock shaft is damaged.

2. The electric seal as claimed in claim 1, wherein said lock shaft includes an insulated covering disposed and located between said first portion and said second portion of said lock shaft.

3. The electric seal as claimed in claim 2, wherein said lock shaft includes an electrical conductive member mounted onto said lock shaft and contacted with said insulated covering, and said electrical conductive member includes an upper portion extended out of said insulated covering and electrically connected to said second portion of said lock shaft and includes a lower portion.

4. The electric seal as claimed in claim 3 further comprising a first electrode electrically connected to said first portion of said lock shaft and electrically connected to said first contact of said wireless telecommunicating device, and a second electrode electrically connected to said second portion of said lock shaft and electrically connected to said second contact of said wireless telecommunicating device.

5. The electric seal as claimed in claim 4 further comprising a seat disposed on said receptacle and including a hole formed in said seat for engaging with said lock shaft, and including a peripheral flange located around said hole of said seat, and said first electrode being attached to said peripheral flange of said seat and extended downwardly beyond said seat for electrically connecting and engaging with said first contact of said wireless telecommunicating device, and said second electrode being attached to said peripheral flange of said seat and extended downwardly beyond said seat for electrically connecting and engaging with said second contact of said wireless telecommunicating device.

6. The electric seal as claimed in claim 5, wherein said receptacle includes an aperture formed therein and aligned with said opening of said housing and said hole of said seat for engaging with said lock shaft.

7. The electric seal as claimed in claim 6, wherein said receptacle includes a cavity formed therein and communicating with said cavity of said receptacle for receiving and engaging with said housing.

8. The electric seal as claimed in claim 5, wherein said electrical conductive member includes an outwardly inclined skirt formed in said lower portion of said electrical conductive member for engaging with said peripheral flange of said seat.

9. The electric seal as claimed in claim 3, wherein said lock shaft includes a sheath attached onto the lock shaft and engaged with said electrical conductive member for covering and shielding the lock shaft and the conductive member, and said sheath includes an outwardly inclined peripheral member for engaging with the peripheral flange of the seat.

10. The electric seal as claimed in claim 1, wherein said lock shaft includes a groove formed in the first portion of the lock shaft, and said housing includes a latch member for selectively engaging with the groove of the lock shaft and for locking the lock shaft to the housing.

11. The electric seal as claimed in claim 1, wherein said housing includes a chamber formed therein for receiving and engaging with an antenna member, and said lock shaft includes a bore formed therein for receiving and engaging with a circuit board, and the circuit board includes a lower end portion for engaging with the antenna member and includes an RFID chip coupled to the circuit board.

12. The electric seal as claimed in claim 11, wherein said housing includes a lock member engaged in said chamber of said housing, said antenna member is engaged in the lock member and includes an upper segment, said lock shaft includes a shank received and engaged in said bore of the lock shaft and extended out of the lock shaft and selectively contacted with said upper segment of said antenna member.

* * * * *